United States Patent [19]

Hinchcliffe et al.

[11] 4,350,242
[45] Sep. 21, 1982

[54] CONVEYOR SYSTEMS FOR CIGARETTES AND SIMILAR ROD-LIKE ARTICLES

[75] Inventors: Dennis Hinchcliffe; Stanley V. Starkey; William A. Stone, all of London, England

[73] Assignee: Molins Limited, London, England

[21] Appl. No.: 125,665

[22] Filed: Feb. 28, 1980

Related U.S. Application Data

[63] Continuation of Ser. No. 859,708, Dec. 12, 1977, abandoned.

[30] Foreign Application Priority Data

Dec. 16, 1976 [GB] United Kingdom ............... 52473/76

[51] Int. Cl.³ .............................................. B65G 15/14
[52] U.S. Cl. .................................... 198/605; 198/607; 198/626
[58] Field of Search ............... 198/347, 445, 447, 436, 198/601, 604, 605, 626, 627, 629, 607; 131/108; 53/148

[56] References Cited

U.S. PATENT DOCUMENTS

| | | | |
|---|---|---|---|
| 3,122,233 | 2/1964 | Hovick | 198/605 |
| 4,078,648 | 3/1978 | Hincheliffe et al. | 198/347 |
| 4,120,391 | 10/1978 | Molini et al. | 198/347 |

Primary Examiner—Robert B. Reeves
Assistant Examiner—Douglas D. Watts
Attorney, Agent, or Firm—Antonelli, Terry & Wands

[57] ABSTRACT

A cigarette elevator for conveying upwards a stack-like stream of cigarettes comprises substantially parallel upwardly-extending conveyors of which at least one has transversely extending ribs on its operative face for engaging the cigarettes, a first pulley around which the ribbed conveyor passes at the upper end of the elevator, and a second pulley which is adjacent to the first pulley and has an axis of rotation which is parallel to (but slightly offset from) the axis of rotation of the first pulley, and including a substantially horizontal conveyor which passes around the second pulley, the arrangement being such that the ribs on the ribbed conveyor disappear progressively below the upper surface of the horizontal conveyor.

32 Claims, 9 Drawing Figures

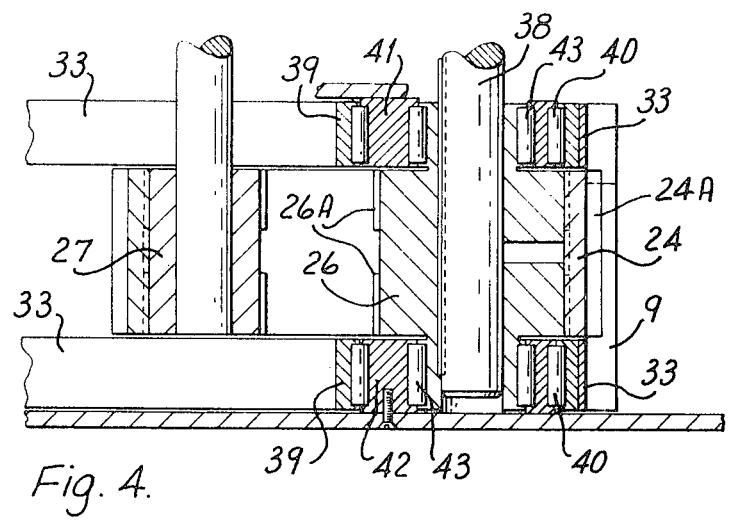
Fig. 4.
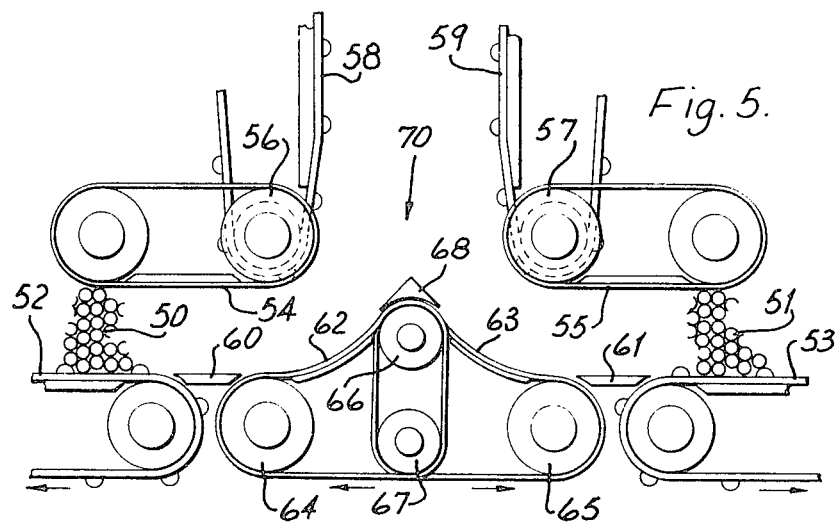
Fig. 5.
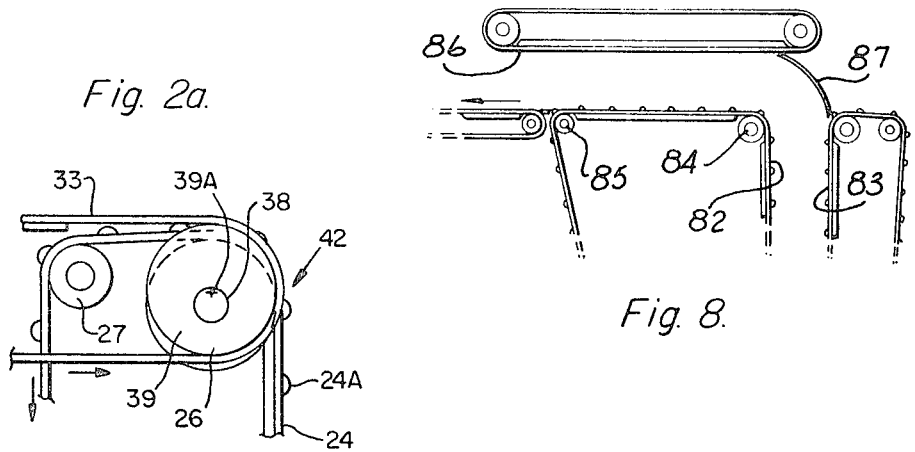
Fig. 2a.
Fig. 8.

CONVEYOR SYSTEMS FOR CIGARETTES AND SIMILAR ROD-LIKE ARTICLES

This is a continuation of application Ser. No. 859,708, filed Dec. 12, 1977, now abandoned.

This invention is concerned mainly with modifications of the invention described in our British Patent Specifications Nos. 1,453,191, 1,453,192 and 1,453,193. Reference is directed to these specifications in their entirety and also to our later British Patent application No. 15783/75.

This invention will be described with reference to cigarettes, but it should be understood that the term "cigarette" is intended in this context to include other similar rod-like articles, in particular cigarette filter rods.

One aspect of this invention is concerned with a cigarette stack elevator including at least one conveyor formed with transverse ribs for engaging the cigarettes to assist in carrying the cigarettes upwards. According to this invention, the ribbed conveyor, at the upper end of the elevator, passes around a first pulley adjacent to which there is a second pulley rotatable about an axis parallel to (but slightly offset from) that of the first pulley, and the arrangement includes a substantially horizontal conveyor which passes around the second pulley, the arrangement being such that the ribs on the ribbed conveyor disappear progressively below the upper surface of the horizontal conveyor.

In one possible arrangement according to this invention, the second pulley has a larger diameter than the first pulley and has its axis horizontally offset from that of the first pulley by a distance substantially equal to the difference between the radial dimensions of the two pulleys, so that the bands on the two pulleys are substantially flush in a region at the upper end of the elevator. As an alternative, however, the second pulley could be of approximately the same diameter as the first pulley, with its axis lying above that of the first pulley so that the upper region of the second pulley, as in the first mentioned arrangement, lies above that of the first pulley to facilitate disappearance of the ribs below the upper surface of the second conveyor band in a region above the axes of the two pulleys.

According to another aspect of this invention (which may be combined with the first aspect of this invention) for delivering the output of two cigarette making machines to a single overhead conveyor, a cigarette stack elevator is arranged to form an inverted T-junction with horizontal stack conveyors delivering cigarettes respectively from the two making machines, and the system includes two conveyor bands arranged to carry the cigarette stacks from the respective horizontal conveyors obliquely upwards into a merger zone lying approximately between the lower ends of two elevator bands arranged to carry the combined stack upwards.

The elevator bands are preferably formed with transverse ribs, as described in our earlier patent specifications. However, as an alternative, one or both conveyor bands may be arranged to grip the adjacent cigarettes either by virtue of being air pervious and by being in communication with a suction space so that cigarettes are drawn towards the band by the suction. Another possibility is that one band may carry flexible brush-like bristles for gripping the cigarettes.

Other aspects and preferred features of this invention will be understood from the following description with reference to the accompanying drawings. In the drawings:

FIG. 2a shows a modification of the upper pulley arrangement of FIG. 2.

FIG. 4 is a section on the line IV—IV in FIG. 2;

FIG. 5 is a diagrammatic view of an alternative form for the lower end of the elevator by which flows from two sources are combined;

FIG. 8 shows another possible modification of the upper end of the elevator.

Figure 1:
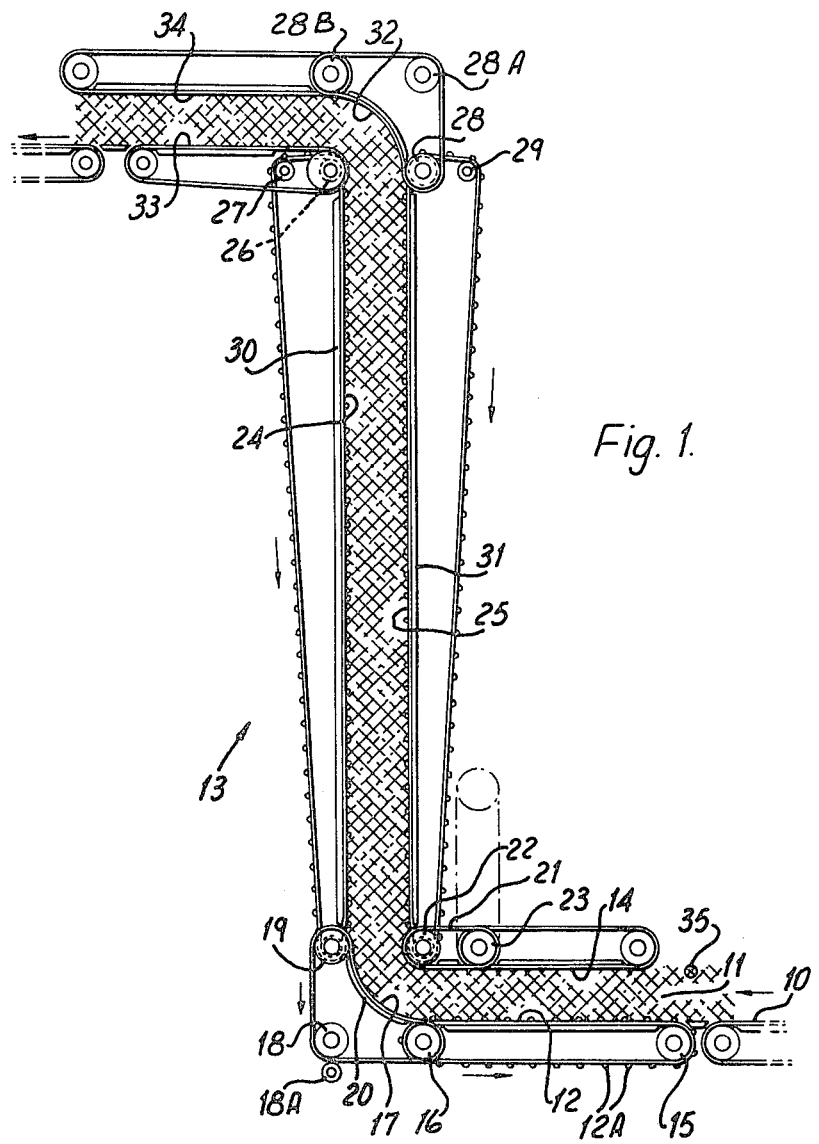
FIG. 1 is an overall front view of one cigarette elevator according to this invention.
Figure 3:
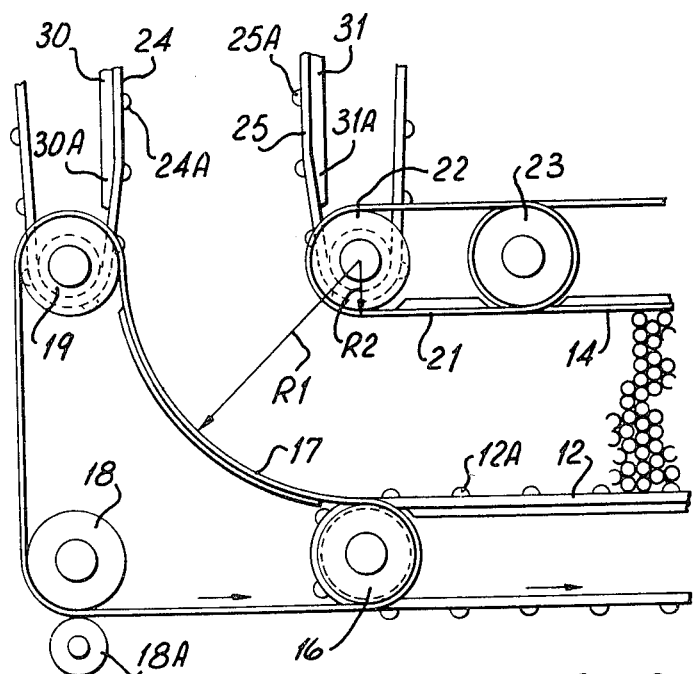
FIG. 3 is an enlarged view of the lower end of the elevator shown in FIG. 1.

FIG. 1 shows a conveyor band 10 which is arranged to receive a continuous stack-like stream of cigarettes 11 delivered from a cigarette making machine (not shown). An independently driven conveyor band 12 receives the stack 11 and drives the stack forwards into the lower end of elevator 13 with the aid of a top band 14 driven in unison with the band 12. As shown in FIG. 1 and also in FIG. 3, the band 12 has transverse ribs 12a to assist the forward drive of the cigarettes.

The band 12 passes around pulleys 15 and 16, and the pulley 16 also serves as a guide for a pair of narrow laterally spaced bands 17 which pass around additional pulleys 18 and 19. In passing between the pulley 16 and the pulley 19, the bands 17 are supported by a curved backing member 20. The cigarettes are driven into the elevator by the band 12 in cooperation with a pair of narrow bands 21 passing around pulleys 22 and 23. The bands 17 lie on opposite sides of the band 12, and the bands 21 likewise lie on opposite sides of the band 14. Bands 21 are driven in unison with the bands 12 and 14 the bands 17 are driven by the pulley 18 with the aid of a pinch roller 18a at a somewhat higher speed, for example $S \times R1/R2$, where S is the speed of the bands 21, and R1 and R2 are the radial dimensions of the paths along which the bands move (see FIG. 3).

The pulley 22 preferably has end flanges which project radially slightly beyond the outer surfaces of the bands 21 and have polished outer surfaces relative to which the adjacent cigarettes (which tend to move more slowly, being on the inside of the bend) can slip.

The elevator itself is formed by parallel upwardly moving ribbed bands 24 and 25. At their lower ends these bands pass around the pulleys 19 and 22 (lying between the laterally spaced pairs of bands 17 and 21 respectively), while at their upper ends they pass around pulleys 26, 27 and 28, 29 respectively. The bands 24 and 25 are driven in unison at the same speed as the bands 12 etc. Fixed backing plates 30 and 31 behind the operative runs of the bands 24 and 25 define the spacing between the bands, which is equal to the spacing between the horizontal conveyor bands 12 and 14, for example 9 cms.

At the upper end of the elevator, a pair of laterally spaced bands 32 lying on opposite sides of the band 25, carries the stack around the pulley 26 (in a manner similar to the bands 17) and the stack is then received between lower and upper horizontal conveyor bands 33 and 34; the bands 32 pass around the pulley 28 and also around pulleys 28A and 28B. The bands 33 and 34 are driven in unison with the elevator bands 24 and 25 (i.e. at the same speed) while the bands 32 are driven at a higher speed, e.g. in accordance with the speed ratio mentioned in connection with the bands 17.

In practice the machine operator may be required to take samples of the cigarettes from time to time for inspection purposes. For this purpose, handfuls of the cigarettes may be taken from the region above the conveyor 10. The presence of a recess in the stack of cigarettes is then detected by a photo-electric device 35 which stops the drive to the downstream conveyor bands until the stack has built up to a full height in which it again obscures the photo-electric device 35, whereupon the drive to the downstream conveyor bands is resumed. Access may also, or as an alternative, be provided to the stack of cigarettes in the region above the conveyor band 12, for which purpose the upper band 14 may be capable of swinging upwards (as shown in broken outline in FIG. 1) about the axis of the pulley 23. If a horizontally foreshortened arrangement is needed, possibly with provision for cigarette sampling from the region of the band 12, the photo-electric device 35 may be mounted just below the bands 21; in that case the photo-electric device would control the drive to the bands 20, the elevator bands 24 and 25 and the other bands further downstream.

Figure 2:
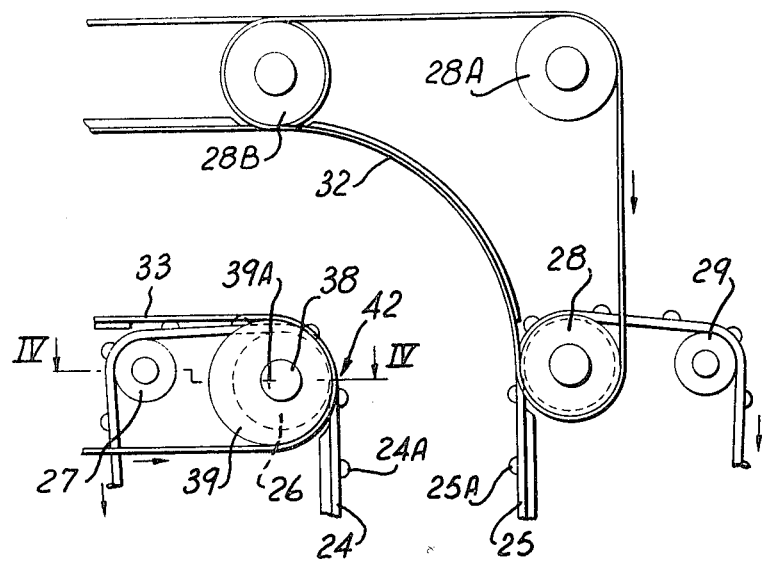
FIG. 2 is an enlarged view of the upper end of the elvator shown in FIG. 1.

As shown in FIGS. 2 and 4, the pulley 26 is mounted on a drive shaft 38 by which the pulley 26 and consequently the belt 24 is driven, the belt having regular transverse recesses forming a toothed rear configuration (not shown) whereby it is driven by engagement with teeth 26A on the pulley 26; the belt 25 is likewise driven by the pulley 22; the pulleys 26 and 28 are coupled by a chain (not shown). Two additional pulleys 39 are mounted at opposite ends of the pulley 26 so as to rotate about an axis parallel to but displaced from that of the pulley 26. This is achieved by mounting the pulleys 39 via bearings 40 around stationary members 41 and 42 which also carry within them bush-like end extensions of the pulley 26 via further bearings 43.

The pulleys 39 guide the pair of laterally spaced horizontal bands 33. It will be seen that the pulleys 39 have a larger diameter than the pulley 26 and have their axis 39A horizontally offset from the axis of the pulley 26 and shaft 38 by a distance substantially equal to the difference between the radial dimensions of the pulleys 39 and 26. As a result, the outer surfaces of the bands 33 are flush with the outer surface of the band 24 at the upper end of the elevator (i.e. in the region 42 indicated in FIG. 2) so as to allow ribs 24A on the conveyor band 24 still to engage in the stack of cigarettes in that region; then as the stack moves upwards around the pulley 26, the ribs 24A disappear progressively below the upper surfaces of the bands 33, and lie entirely below the upper surfaces of the bands 33 in the region above the pulleys 26 and 39 where the cigarettes begin to be conveyed horizontally. One cigarette 9 is shown adjacent to the pulley 26 for the purpose of illustration in FIG. 4.

FIG. 2a shows a modified upper pulley configuration in which the pulley 26 is of approximately the same diameter as the pulleys 39, with the axis 39A of the pulleys 39 lying above that of the pulley 26. As in the arrangement of FIG. 2, this structural configuration also will faciliate disappearance of the ribs 24A below the upper surface of the conveyor band 33 in the region above the axes of these pulleys.

At the lower end of the elevator (FIG. 3) it should be noted that the backing members 30 and 31 have chamfered lower end portions 30A and 31A as a result of which the bands 24 and 25 converge slightly for a short distance. This allows the ribs 24A and 25A to emerge progressively from positions in which they are recessed below the surfaces of the bands 17 and 21 respectively. After converging slightly (as shown) the bands 24 and 25 are spaced apart by a distance equal to the distance between the horizontal conveyor bands 12 and 14; that distance (defining the stack thickness) is also equalled by the radial distance between the bands 17 and 21 (i.e. R1-R2).

FIG. 5 shows a modified lower end portion for the elevator. This allows stacks of cigarettes 50 and 51, which are carried by ribbed conveyors 52 and 53 from two separate cigarette making machines (not shown) to be merged at the lower end of the elevator.

As each stack approaches the elevator, it is driven by the corresponding band 52 or 53 and a cooperating pair of laterally spaced narrow bands 54 or 55 which pass around end portions of lower pulleys 56 and 57 for elevator bands 58 and 59. The arrangement is shown somewhat diagrammatically in FIG. 5 and would in practice be similar to the arrangement shown in FIG. 3 as far as possible.

After passing over stationary bridges 60 and 61, the two stacks of cigarettes are carried obliquely upwards into a merger zone 70 between the lower ends of the elevator bands, by bands 62 and 63; one of the bands 62 and 63 comprising a single wide band while the other comprises two laterally spaced narrow bands passing on opposite sides of the wide band. The bands 62, 63 pass around pulleys 64 and 65 adjacent to the bridges and around additional composite pulleys 66 and 67, these composite pulleys being formed in a number of parts which are relatively rotatable to allow the bands to move in the appropriate directions. Above the pulley 66 there is a fixed triangular cover 68 to prevent simultaneous contact of both bands with the cigarettes in that region and to assist in guiding the cigarettes obliquely upwards.

The arrangement shown in FIG. 5 may sometimes be required to operate with one of the conveyor bands 52 or 53 stationary, i.e. when one of the cigarette making machines is temporarily out of action. In that case the elevator bands 58 and 59 would be driven at half speed.

Figure 6:
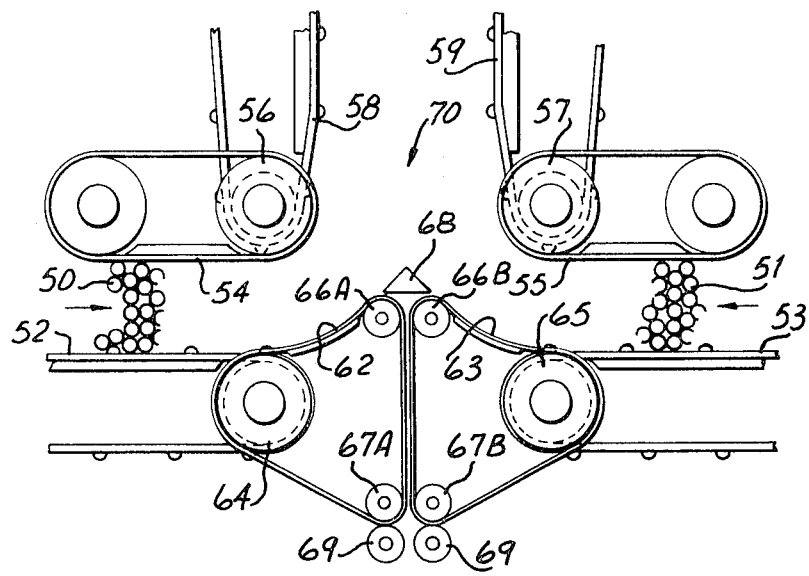
FIG. 6 shows a modification of the arrangement shown in FIG. 5.

FIG. 6 shows a modification of the arrangement shown in FIG. 5. Similar reference numerals are used where possible. One difference is that the composite pulleys 66 and 67 are replaced by separate horizontally spaced pulleys 66A, 66B and 67A, 67B respectively. The bands 62 and 63 in this case each comprise a pair of laterally spaced narrow bands which pass around end portions of the pulleys 64 and 65 respectively on opposite sides of the bands 52, 53, which also return around the pulleys 64, 65. The bands 62 and 63 are driven respectively by the pulleys 67A and 67B with the aid of pinching rollers 69.

If the elevator is required to be emptied after each work period, this can be done by driving in reverse the elevator bands 58, 59 and at least one of the two sets of bands 52, 54, 62 or 53, 55, 63.

In both examples shown in FIGS. 5 and 6 there may be provision for hand sampling of cigarettes from the conveyors 52 and 53. For that purpose, a photoelectric device may be mounted just below each of the pulleys 56 and 57 to detect a recess in the level of cigarettes delivered by the conveyor 52 or 53. On detecting a recess, each photo-electric device may be arranged to stop the drive of the associated upwardly inclined band 62 or 63 until the recess is filled. Stoppage of one of the bands 62 or 63 may also automatically be arranged to halve the speed of the elevator bands 58, 59.

Figure 7:
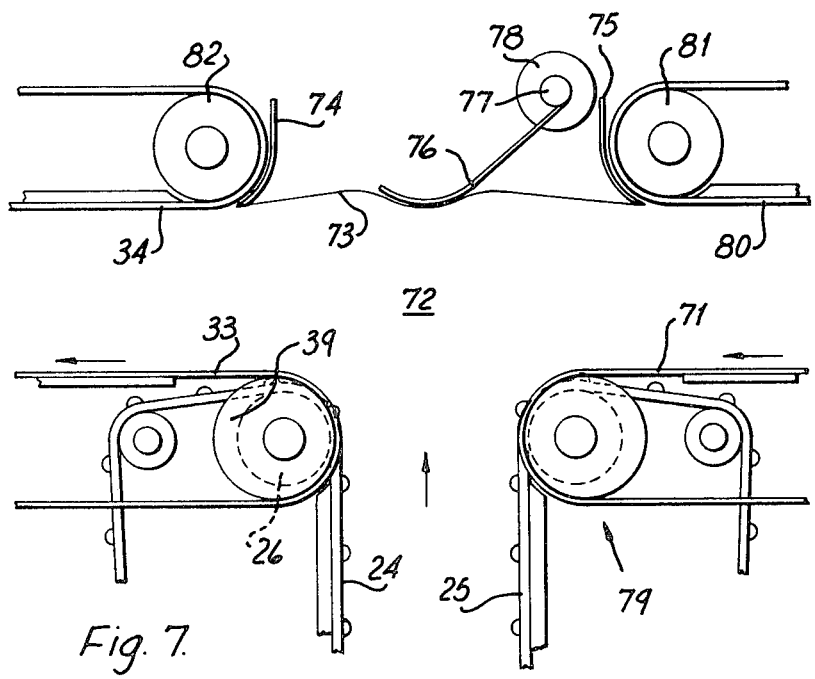
FIG. 7 shows a modification of the upper end of the elevator for forming a junction with two horizontal overhead conveyors.

FIG. 7 shows a modification of the upper end of the elevator. In this modification certain parts are the same as in FIG. 2, as shown by the use of the same reference numerals.

The arrangement shown in FIG. 7 forms a junction between the elevator (comprising ribbed bands 24, 25), a horizontal overhead stack conveyor 33 and a second horizontal overhead stack conveyor 71. The cigarette flows from the elevator 24, 25 and conveyor 71 are combined in a junction zone 72. The cigarettes are confined in the junction zone by a flexible membrane 73 secured at its ends to fixed plates 74 and 75. A sensor member 76 rests on the membrane 73 and is carried by the spindle 77 of a regulator 78 which controls the speed of the conveyor 33 in response to movement of the sensor member 76 in a known manner.

The elevator band 24 and the conveyor 71 (which comprises two laterally spaced bands) pass around a composite pulley 79 which is similar to (being a mirror image of) the composite pulley 26, 39 shown in FIGS. 2 and 4. Thus the composite pulley 79 needs no description.

The conveyor 71 may be arranged to receive cigarettes from an elevator similar to that shown in FIG. 1; the two elevators in this case may deliver the outputs from two cigarette making machines, this combined output being fed by the conveyor 33 to one or more cigarette packing machines. If one making machine stops, the reduced flow into the junction zone 72 is detected by the sensor 76 and the speed of the conveyor 33 is controlled accordingly (i.e. approximately halved). If it is the maker associated with the elevator 24, 25 that stops then the cigarettes delivered from the other maker by the conveyor 71 must pass through the junction zone 72, over the stationary cigarettes in the elevator 24, 25 to the conveyor 33; this flow is facilitated by the use of the composite pulleys in accordance with the invention.

Above the conveyor 71 there is a top band 80 which moves in unison with the conveyor 71 and returns around a pulley 81 adjacent to the plate 75. The top band 34 in this case passes around a pulley 82 adjacent to the plate 74, this pulley being further to the left than the pulley in FIG. 2 to provide a sufficient width for the junction zone 72.

Instead of the conveyor 71 in FIG. 7 moving unidirectionally towards the junction zone 72, it could be reversible to serve as at least part of a reservoir. The direction of motion of the conveyor 71 could then be controlled by the sensor 76.

FIG. 8 shows a simplified arrangement of the upper end of the elevator which omits the composite pulley 26, 39 shown in FIGS. 1, 2 and 4. In this example the elevator is formed by ribbed conveyor bands 82 and 83 of which the conveyor 83 is identical to the elevator conveyor 25 in FIG. 1. The conveyor 82 corresponds to conveyor 24 in FIG. 1 and similar apart from the fact that it extends horizontally for a short distance after passing around an upper pulley 84 and before returning around a pulley 85. Thus the cigarette stack is conveyed horizontally for a short distance by the conveyor 82 in cooperation with a top band 86 arranged to move in unison with the band 82. Furthermore, in place of the bands 32 in FIG. 1 there is a fixed curve plate 87 of which the lower edge is cut away to provide a recess through which the ribs on the band 83 can pass; however, bands such as the bands 32 may be provided.

We claim:

1. A cigarette elevator for conveying upwards a stack-like stream of cigarettes, comprising spaced substantially parallel, upwardly-extending conveyors of which at least one has transversely-extending ribs on its operative face for engaging the cigarettes, a first pulley around which the ribbed conveyor passes at the upper end of the elevator, and a second pulley which is adjacent to the first pulley and has an axis of rotation which is parallel to but laterally spaced from the axis of rotation of the first pulley, and including a substantially-horizontal conveyor which passes around the second pulley, the first and second pulleys being relatively positioned such that the ribs on the ribbed conveyor disappear progressively below the upper run of the horizontal conveyor as the ribs pass around said first pulley from a point of vertically-upward movement substantially to a point of horizontal movement thereof.

2. A cigarette elevator according to claim 1, in which said second pulley has a larger diameter than said first pulley and has its axis of rotation horizontally offset from that of said first pulley.

3. A cigarette elevator according to claim 2, in which the axis of rotation of said second pulley is offset from that of said first pulley by a distance substantially equal to the difference between the radial dimensions of the two pulleys.

4. A cigarette elevator according to claim 2 or 3, wherein the difference between the radial dimensions of said first and second pulleys is substantially equal to the distance by which said ribs project from said ribbed conveyor.

5. A cigarette elevator according to claim 1, in which said second pulley is of approximately the same diameter as said first pulley and lies with its axis of rotation above that of said first pulley.

6. A cigarette elevator according to claims 1, 2 or 5, wherein the axis of rotation of said second pulley is offset from the axis of rotation of said first pulley by a distance substantially equal to the distance by which said ribs project from said ribbed conveyor.

7. A cigarette elevator according to claim 1, in which the second pulley comprises two parts disposed at opposite ends of said first pulley, said second substantially-horizontal conveyor comprising two parts which pass around the respective parts of said second pulley for supporting the cigarettes at or near their opposite ends.

8. A cigarette elevator according to claim 7, in which the two parts of said second pulley are rotatably mounted around fixed members which also carry opposite end portions of the first pulley.

9. A cigarette elevator according to claim 8, wherein said fixed members are spaced annular members, said first pulley having first bearing means mounted within the hollow of said annular members and said second pulley having second bearing means which rotatably support the two parts of said second pulley around the periphery of said annular members.

10. A cigarette elevator according to claim 1, including a lower horizontal conveyor arranged to feed the cigarettes into the lower end of the elevator as a cigarette stack of a thickness substantially equal to the spacing between the upwardly-extending conveyors of the elevator, and including a pair of conveyor bands arranged to move along a curved path for conveying the cigarette stack from the lower horizontal conveyor and into the space between the lower ends of the upwardly-extending conveyors while maintaining the cigarette stack at substantially the same thickness.

11. A cigarette elevator according to claim 10, wherein a fixed backing plate is positioned behind the operative run of at least said ribbed conveyor, a third pulley around which said ribbed conveyor passes being located at the lower end of the elevator, and said backing plate being chamfered at its lower end adjacent said third pulley so that said ribs emerge progressively into engagement with the cigarettes carried by said pair of conveyor bands which move along a curved path.

12. A cigarette elevator according to claim 11, further including means for driving said pair of conveyor bands at a speed which is faster than the speed of said lower horizontal conveyor.

13. A cigarette elevator according to claim 1, including a pair of conveyor bands arranged to move along a curved path along which the cigarette stack is conveyed onto said first-mentioned horizontal conveyor from the space between the upper ends of the upwardly-extending conveyors.

14. A cigarette elevator according to claim 1, wherein a fixed curved plate is disposed at the top of said elevator to guide the cigarette stack onto said first-mentioned horizontal conveyor from the space between the upper ends of the upwardly-extending conveyors.

15. A cigarette elevator according to claim 1, including two lower horizontal conveyors arranged to feed stacks of cigarettes to the lower end of the elevator from opposite directions, each cigarette stack being arranged to have a thickness substantially equal to half the spacing between the upwardly-extending conveyors.

16. A cigarette elevator according to claim 15, including conveyors arranged to move along curved paths between the lower horizontal conveyors and the elevator for conveying the cigarette stacks from the lower horizontal conveyors upwards into the space between the lower ends of the upwardly-extending conveyors of the elevator.

17. A conveyor system for delivering the output of two cigarette making machines to a single overhead conveyor, including a cigarette stack elevator comprising two spaced vertical bands arranged to form an inverted T-junction with horizontal stack conveyors delivering cigarettes respectively from the two cigarette making machines, and including two upwardly-inclined conveyors arranged to carry cigarette stacks from the respective horizontal conveyors obliquely upwards into a merger zone lying approximately between lower ends of two elevator bands arranged to carry the combined stack upwards, each of said upwardly-inclined conveyors comprising two narrow bands located on opposite sides of the respective horizontal stack conveyor and on opposite sides of the respective elevator band.

18. A cigarette elevator for conveying upwards a stack-like stream of cigarettes, comprising substantially-parallel, upwardly-extending conveyors of which at least one has transversely-extending ribs on its operative face for engaging the cigarettes, a first pulley around which the ribbed conveyor passes at the upper end of the elevator, a second pulley comprising two similar coaxial parts carried adjacent to opposite ends of the first pulley and having their common axis parallel to but laterally offset from the axis of the first pulley whereby the outer surfaces of the two parts of the second pulley at the upper end of the vertical run of the ribbed conveyor start substantially flush with, and rise progressively above, the outer surface of the first pulley, and including a horizontal conveyor formed by a pair of substantially-horizontal conveyor bands arranged to pass around the respective parts of the second pulley for conveying the stack of cigarettes from the upper end of the elevator conveyors.

19. A cigarette elevator according to claim 18, wherein the axis of rotation of said second pulley is offset from the axis of rotation of said first pulley by a distance substantially equal to the distance by which said ribs project from said ribbed conveyor.

20. A cigarette elevator according to claims 18 or 19, in which said second pulley has a larger diameter than said first pulley and has its axis of rotation horizontally offset from that of said first pulley.

21. A cigarette elevator according to claims 18 or 19, in which said second pulley is of approximately the same diameter as said first pulley and lies with its axis of rotation above that of said first pulley.

22. A cigarette elevator according to claim 18, in which said second pulley has a larger diameter than said first pulley, the difference between the radial dimensions of said first and second pulleys being substantially equal to the distance by which said ribs project from said ribbed conveyor.

23. A cigarette elevator according to claim 18, wherein both of said upwardly-extending conveyors have transversely-extending ribs disposed at spaced points along the operative surfaces thereof, and further including curved guide means at the top of said elevator for guiding the cigarette stack from the space between the upper ends of the upwardly-extending conveyors onto said horizontal conveyor.

24. A cigarette elevator according to claim 18, including two lower horizontal conveyors arranged to feed stacks of cigarettes to the lower end of the elevator from opposite directions, each cigarette stack being arranged to have a thickness substantially equal to half the spacing between the upwardly-extending conveyors.

25. A cigarette elevator according to claim 18, further including means defining a junction zone above the top of said upwardly-extending conveyors and adjacent said horizontal conveyor so that cigarettes conveyed through said elevator into said junction zone may pass onto said horizontal conveyor.

26. A cigarette elevator according to claim 25, further including sensor means responsive to cigarettes entering said junction zone for controlling movement of said horizontal conveyor.

27. A cigarette elevator according to claim 25, further including a second horizontal conveyor disposed adjacent said junction zone on the side thereof opposite said first-mentioned horizontal conveyor.

28. A cigarette elevator according to claim 27, further including sensor means responsive to cigarettes entering said junction zone for controlling the movement of said second horizontal conveyor.

29. A cigarette conveyor system for conveying upwards a stack-like stream of cigarettes, comprising an elevator formed by substantially-parallel, upwardly-extending conveyors of which at least one has transversely-extending ribs disposed at spaced points along the operative surface thereof for engaging the cigarettes, a first pulley around which the ribbed conveyor passes at the upper end of the elevator, a second pulley comprising two similar coaxial parts carried adjacent to opposite ends of the first pulley and having their common axis parallel to but laterally offset from the axis of said first pulley whereby the outer surfaces of the two parts of the second pulley at the upper end of the vertical run of the ribbed conveyor start substantially flush with, and rise progressively above, the outer surface of said first pulley, means defining a junction zone above said elevator, and horizontal conveyor means including a pair of substantially-horizontal conveyor bands arranged to pass around the respective parts of said second pulley for conveying a stack of cigarettes into said junction zone above said elevator.

30. A cigarette conveyor system according to claim 29, wherein second horizontal conveyor means is disposed adjacent said junction zone on the side thereof opposite said first-mentioned horizontal conveyor means for conveying a stack of cigarettes from said junction zone.

31. A cigarette conveyor system according to claim 30, further including sensor means responsive to cigarettes entering said junction zone for controlling said second horizontal conveyor means.

32. A cigarette conveyor system according to claim 29, wherein both of said upwardly-extending conveyors have transversely-extending ribs disposed along the operative surfaces thereof.

* * * * *